United States Patent
DeFranks et al.

(10) Patent No.: US 11,105,040 B2
(45) Date of Patent: Aug. 31, 2021

(54) BEDDING PRODUCT INCLUDING COMPOSITE LAYER AND METHOD OF MANUFACTURE

(71) Applicant: Dreamwell, Ltd., Las Vegas, NV (US)

(72) Inventors: Michael S. DeFranks, Atlanta, GA (US); Sheri L. McGuire, Duluth, GA (US)

(73) Assignee: DREAMWELL, LTD., Las Vegas, NV (US)

(*) Notice: Subject to any disclaimer, the term of this patent is extended or adjusted under 35 U.S.C. 154(b) by 508 days.

(21) Appl. No.: 14/958,251

(22) Filed: Dec. 3, 2015

(65) Prior Publication Data
US 2016/0157630 A1    Jun. 9, 2016

Related U.S. Application Data

(60) Provisional application No. 62/087,573, filed on Dec. 4, 2014.

(51) Int. Cl.
*D06N 3/00* (2006.01)
*A47C 27/12* (2006.01)
(Continued)

(52) U.S. Cl.
CPC ............ *D06N 3/0011* (2013.01); *A47C 27/12* (2013.01); *A47C 27/14* (2013.01); *C08J 9/0085* (2013.01); *D06N 3/005* (2013.01); *D06N 3/0043* (2013.01); *B29C 44/1209* (2013.01); *B29C 44/329* (2016.11); *B29C 44/332* (2016.11); *B29K 2007/00* (2013.01); *B29K 2023/06* (2013.01); *B29K 2023/12* (2013.01);
(Continued)

(58) Field of Classification Search
CPC ....... A47C 27/12; A47C 27/14; A47C 27/121; A47C 27/122; A47C 27/125; A47C 27/127; A47C 27/142; A47C 27/144; A47C 27/146; A47C 27/148; A47C 27/15; A47C 27/16; A47C 27/22; D06N 3/0043; D06N 3/005; D06N 3/001; B29C 2043/3433; B29C 44/329; B29C 44/332; B29C 2043/3438; B29C 47/0064; B29L 2031/751; B32B 5/02; B32B 5/24; B32B 3/00; B32B 3/02; B32B 3/06; B32B 3/26; D04H 3/163; D10B 2401/08; C08J 9/0085; C08J 9/2201; C08J 2201/03; Y10T 428/23979; B29K 2075/00
See application file for complete search history.

(56) References Cited

U.S. PATENT DOCUMENTS 2,159,213 A * 5/1939 Howard ................. A47C 27/22
                                              2/268
3,691,569 A * 9/1972 Ikada ..................... A47C 23/00
                                              277/936

(Continued)

*Primary Examiner* — Eric J Kurilla
*Assistant Examiner* — Amanda L Bailey
(74) *Attorney, Agent, or Firm* — Cantor Colburn LLP

(57) ABSTRACT

A composite layer for use in a bedding product such as a mattress and a method of manufacture are disclosed. The composite layer generally includes an extruded three dimensional fibrous layer and a foam material, e.g., polyurethane, latex or the like, disposed within the fibrous layer and occupying at least a portion of the free volume in the layer. Also disclosed are processes for manufacturing a foam-fiber composite.

20 Claims, 3 Drawing Sheets

US 11,105,040 B2
Page 2

(51) Int. Cl.
   *A47C 27/14* (2006.01)
   *C08J 9/00* (2006.01)
   *B29C 44/12* (2006.01)
   *B29C 44/32* (2006.01)
   *B29K 23/00* (2006.01)
   *B29L 31/00* (2006.01)
   *B29K 75/00* (2006.01)
   *B29K 7/00* (2006.01)

(52) U.S. Cl.
   CPC ...... *B29K 2075/00* (2013.01); *B29L 2031/751* (2013.01); *C08J 2201/03* (2013.01); *D10B 2403/033* (2013.01); *D10B 2503/00* (2013.01)

(56) References Cited

U.S. PATENT DOCUMENTS

| | | | | |
|---|---|---|---|---|
| 3,837,988 | A * | 9/1974 | Hennen | B32B 27/00 428/92 |
| 4,269,889 | A * | 5/1981 | Takagi | B29C 44/12 428/300.7 |
| 4,293,604 | A * | 10/1981 | Campbell | A47L 23/266 428/314.8 |
| 5,109,784 | A * | 5/1992 | Lepe-Cisneros | D05C 15/26 112/475.23 |
| 5,819,349 | A * | 10/1998 | Schwartz | A47C 23/0431 5/740 |
| 6,347,790 | B1 * | 2/2002 | Nishibori | E01F 15/145 267/146 |
| 7,625,629 | B2 * | 12/2009 | Takaoka | B29C 43/02 428/220 |
| 8,389,425 | B2 * | 3/2013 | Costa | B32B 5/18 428/365 |
| 8,813,286 | B2 | 8/2014 | Khambete et al. | |
| 9,119,476 | B2 * | 9/2015 | Zecca | A43B 1/00 |
| 9,194,066 | B2 * | 11/2015 | Takaoka | B29C 47/0019 |
| 9,314,993 | B2 * | 4/2016 | Lawrence | B32B 5/022 |
| 9,615,670 | B2 * | 4/2017 | Takaoka | B32B 5/18 |
| 2002/0187300 | A1 * | 12/2002 | Nakasuji | B32B 5/26 428/95 |
| 2005/0189059 | A1 * | 9/2005 | Chen | B32B 37/00 156/78 |
| 2005/0266230 | A1 * | 12/2005 | Hill | B32B 5/30 428/317.9 |
| 2009/0162603 | A1 * | 6/2009 | Hain | D04H 1/4274 428/113 |
| 2011/0143083 | A1 * | 6/2011 | Scorgie | A47G 27/0225 428/95 |
| 2012/0167308 | A1 * | 7/2012 | Van Lear | A47C 27/085 5/655.5 |
| 2013/0189472 | A1 * | 7/2013 | Takaoka | D01D 10/00 428/85 |
| 2014/0035191 | A1 * | 2/2014 | Takaoka | B29C 47/0019 264/210.8 |
| 2015/0020316 | A1 * | 1/2015 | Khambete | B68G 11/03 5/655.6 |
| 2017/0043695 | A1 * | 2/2017 | Kitamoto | B60N 2/90 |

* cited by examiner

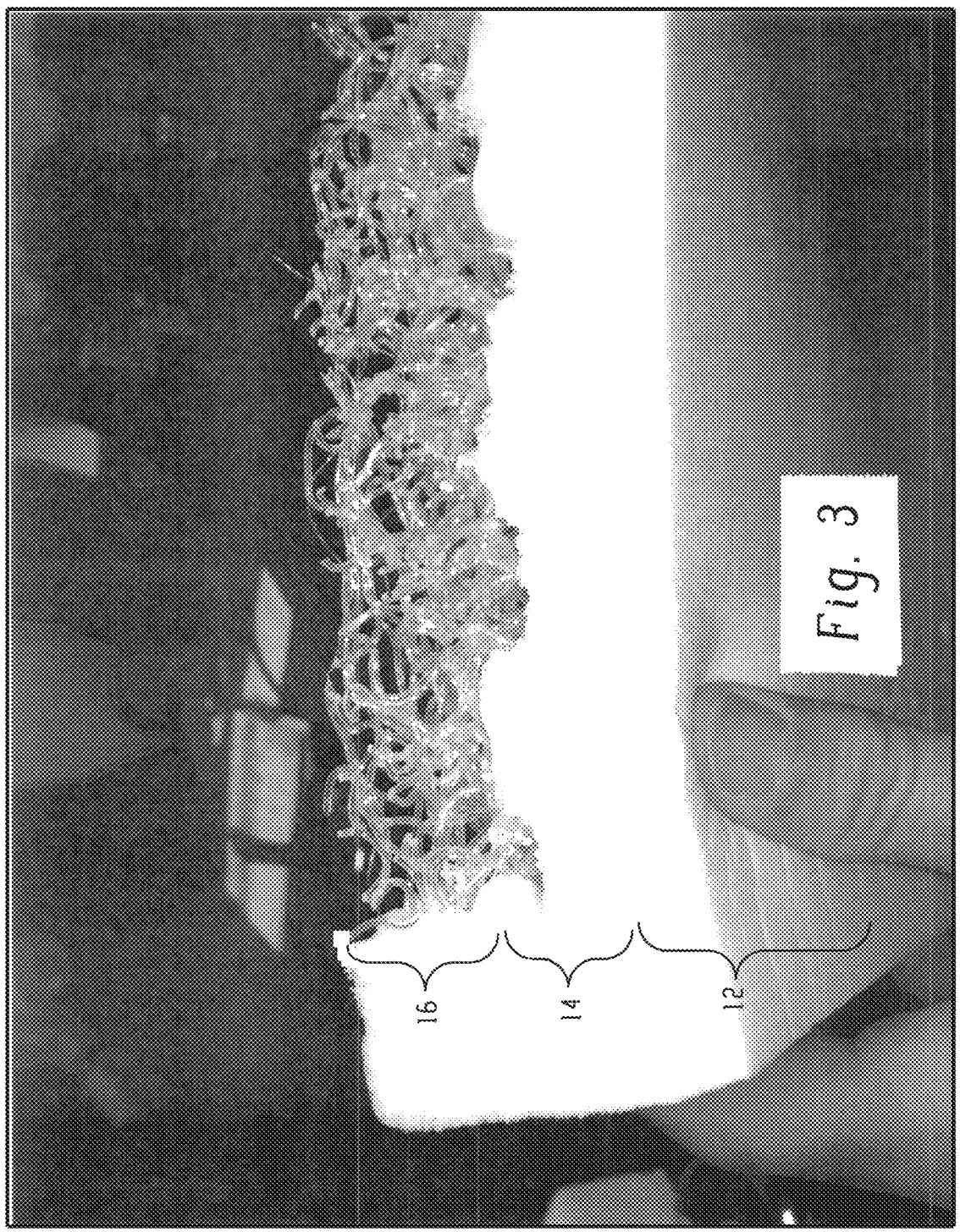

BEDDING PRODUCT INCLUDING COMPOSITE LAYER AND METHOD OF MANUFACTURE

CROSS REFERENCE TO RELATED APPLICATIONS

This Non-provisional application claims the benefit of U.S. Provisional Patent Application Ser. No. 62/087,573 filed Dec. 4, 2014, which is fully incorporated herein by reference in its entirety.

BACKGROUND

The present disclosure generally relates to bedding products and methods of manufacture, and more particularly, to bedding products including a composite layer formed of foam and a three-dimensional polymeric fiber layer.

One of the ongoing problems associated with all-foam mattress assemblies is user comfort. To address user comfort, mattresses are often fabricated with multiple layers having varying properties such as density and hardness, among others, to suit the needs of the intended user. One particular area of concern to user comfort is the level of heat buildup in an all-foam mattress or even hybrid foam mattresses (e.g., foam mattresses that include, in addition to one or more foam layers, spring coils, bladders including a fluid, and various combinations thereof) experienced by the user after a period of time. Additionally, some mattresses can retain a high level of moisture, further causing discomfort to the user and potentially leading to poor hygiene.

Unfortunately, the high density of foams used in current mattress assemblies, particularly those employing traditional memory foam layers that typically have fine cell structure and low airflow, generally prevents proper ventilation. As a result, the foam material can exhibit an uncomfortable level of heat to the user after a period of time.

The three dimensional polymer material in its current design and material composition by itself also does not meet the resiliency or durability requirements to withstand the desired properties for suitable mattress testing. Nevertheless, when utilized as a layer in foam mattresses, the layer of the three dimensional polymer fibers can help alleviate the issues related to heat dissipation due to the amount of free space per unit volume which promotes airflow these materials provide. Typically, the three dimensional polymer fiber layer is sandwiched between two foam layers, wherein the foam layers are laminated to the top and bottom surfaces of the three dimensional fiber layer. However, delamination is oftentimes observed given the relatively low surface area provided at the interface between the three dimensional polymer fiber layer and the foam layer surface. Moreover, Applicants have found that the three dimensional polymer fiber layer is also subject to fatigue in the shear direction such as may occur when a user rolls from side to side on the mattress including the three dimensional polymer layer. Because the three dimensional fiber layer is generally formed via extrusion processing that results in a random or fiber orientation with varied contact points between fibers serving as bonding points to provide rigidity to the layer, shear forces can weaken those bonds to the point of detachment at the bonding points. As a result, compaction of the three dimensional fiber layer can occur.

BRIEF SUMMARY

Disclosed herein are bedding products including at least one layer of a composite layer including a three-dimensional polymeric fiber layer and foam, wherein the foam fills at least a portion of a free volume associated with the three dimensional polymeric fiber layer. Also, disclosed are processes of manufacturing the composite layer.

In one embodiment, a foam-fiber composite layer includes an extruded three dimensional polymer fiber layer having constant length, width and height dimensions, the extruded three dimensional polymer fiber layer comprising randomly oriented polymer fibers bonded at coupling points between adjacent fibers and having a free volume per unit area of the layer; and a foam layer disposed on and in at least one surface of the extruded three dimensional polymer fiber layer, wherein the foam layer extends into a portion of the extruded three dimensional polymer fiber layer.

In other embodiments, a mattress includes at least one foam-fiber composite layer.

The process of manufacturing the foam-fiber composite layer is a two-step process that includes extruding a polymer through a die comprising multiple apertures onto a conveyor to form a three dimensional polymer fiber layer having constant length, width and height dimensions, and wherein the extruded three dimensional polymer fiber layer comprises randomly oriented polymer fibers bonded at coupling points between adjacent fibers and having a free volume per unit area of the layer; injecting or pouring a liquid foam polymer precursor onto and into at least one surface of the extruded three dimensional polymer fiber layer into at least 10 percent of the three dimensional fiber layer; and curing the liquid foam polymer precursor in a mold to form a foam, wherein the foam layer extends into a portion of the extruded three dimensional polymer fiber layer. The process can be configured for batch production or continuous production, e.g., belt pour.

The disclosure may be understood more readily by reference to the following detailed description of the various features of the disclosure and the examples included therein.

BRIEF DESCRIPTION OF THE DRAWINGS

FIG. 3 is a photograph illustrating a partial cross sectional perspective view of the foam-fiber composite layer of FIG. 2.

DETAILED DESCRIPTION

Figure 1:
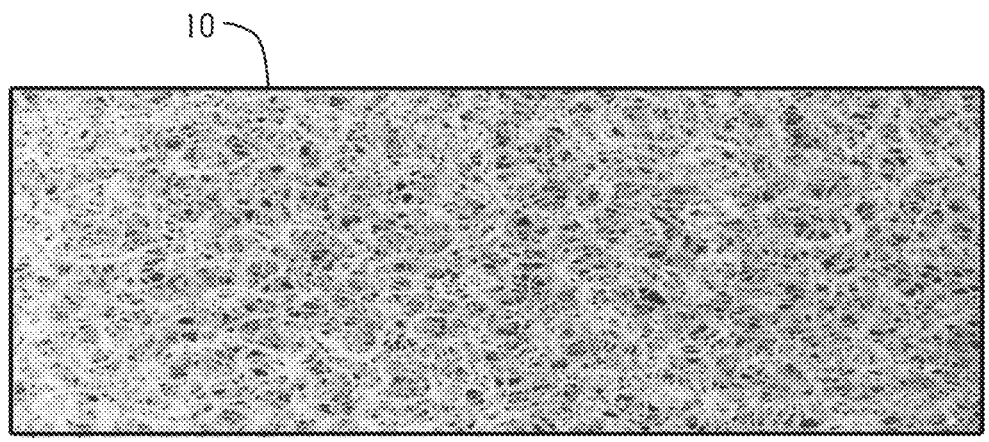
FIG. 1 is a photograph depicting an exemplary three-dimensional polymeric fiber layer.
Figure 2:
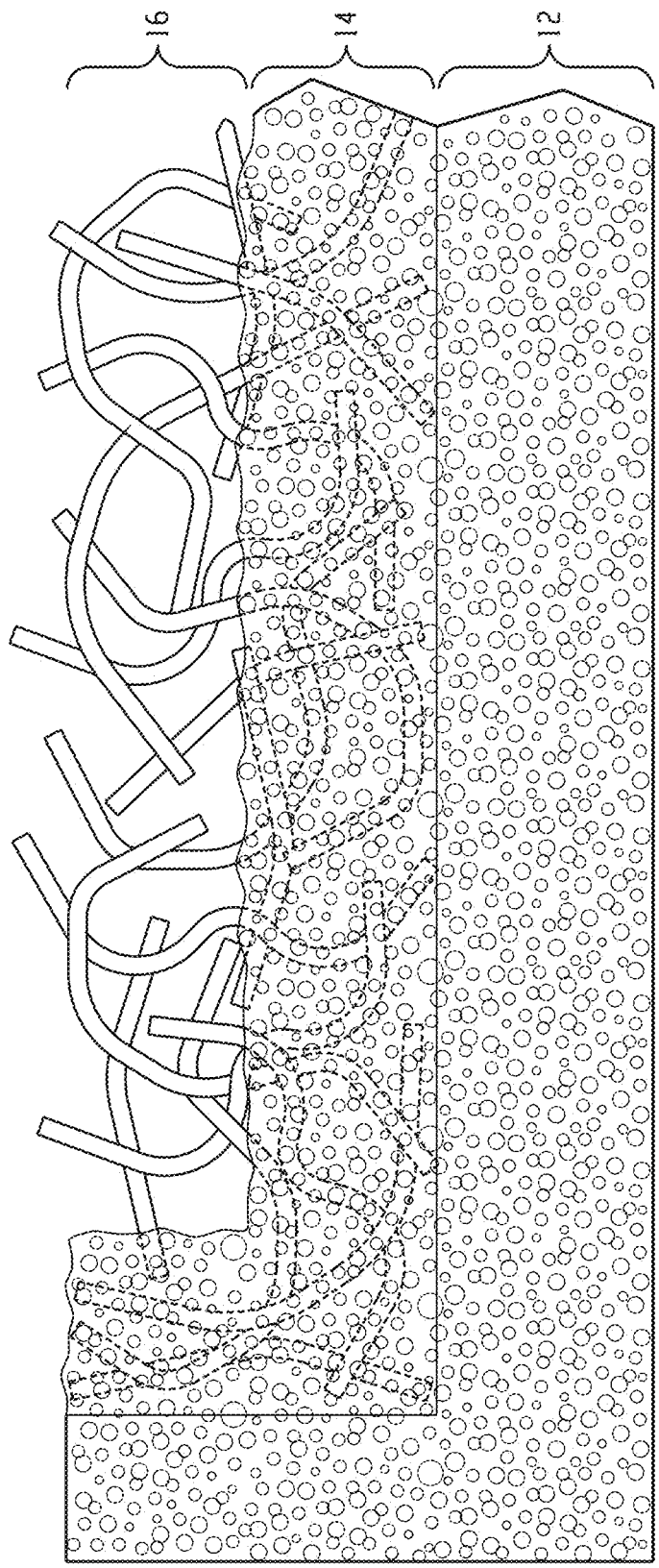
FIG. 2 is a schematically illustrates a partial cross sectional view of a foam-fiber composite layer including a three-dimensional polymeric fiber layer and foam embedded within at least a portion of the three-dimensional polymeric fiber layer fiber layer.

The present disclosure is generally directed to a composite foam/fiber layer for use in a bedding product such as a mattress. The foam/fiber composite layer generally includes an extruded three-dimensional polymeric fiber layer having a defined thickness and a foam material, wherein the foam material extends into a fraction of the extruded three dimensional polymer fiber layer. In this manner, the foam/fiber composite layer includes three distinct portions: a foam-only portion, a foam-fiber portion, and a three dimensional fiber-only portion. FIG. 1 is a photograph depicting a random three-dimensional polymeric fiber layer 10 having a generally rectangular section, wherein the randomly oriented fibers define a significant number of voids, i.e., a relatively large amount of free space per unit area, wherein free space is defined as an area not occupied by a fiber and is also referred to herein as voids. FIGS. 2 and 3 depict a cross sectional view and a photographic cross sectional perspective view, respectively, of the foam-fiber composite including the foam-only portion 12, a foam-fiber portion 14, and a three dimensional fiber-only portion 16.

Generally, the foam-fiber composite is formed by first extruding the desired three dimensional polymer fiber layer. Granules, pellets, chips, or the like of a desired polymer are fed into an extrusion apparatus, i.e., an extruder, at an elevated temperature and pressure, which is typically greater than the melting temperature of the polymer. The polymer, in melt form, is then extruded through a die, which generally is a plate including numerous spaced apart apertures of a defined diameter, wherein the placement, density, and the diameter of the apertures can be the same or different throughout the plate. When different, the three dimensional polymer fiber layer can be made to have different zones of density, e.g., sectional areas can have different amounts of free volume per unit area. For example, the three dimensional polymer fiber layer can include a frame like structure, wherein the outer peripheral portion has a higher density than the inner portion; or wherein the three dimensional polymer fiber layer has a checkerboard like pattern, wherein each square in the checkerboard has a different density than an adjacent square; or wherein the three dimensional polymer fiber layer has different density portions corresponding to different anticipated weight loads of a user thereof. The various structures of the three dimensional polymer fiber layer is not intended to be limited and can be customized for any desired application. In this manner, the firmness, i.e., indention force deflection, and/or density of the three dimensional polymer fiber layer can be uniform or varied depending on the die configuration and conveyor speed.

The fibers are extruded onto a conveyor and subsequently immersed in a cooling bath, which results in entanglement and bonding at coupling points within the entanglement. The rate of conveyance and cooling bath temperature can be individually varied to further vary the thickness and density of the three dimensional polymer fiber layer. Generally, the thickness of the three-dimensional polymeric fiber layer by itself can be extruded as a full width mattress material at thicknesses ranging from 1 to 6 inches and can be produced to topper sizes or within roll form. However, thinner or thicker thicknesses could also be used as well as wider widths if desired.

Suitable extruders include, but are not limited to continuous process high shear mixers such as: industrial melt-plasticating extruders, available from a variety of manufacturers including, for example, Cincinnati-Millicron, Krupp Werner & Pfleiderer Corp., Ramsey, N.J. 07446, American Leistritz Extruder Corp.: Somerville, N.J. 08876; Berstorff Corp., Charlotte, N.C.: and Davis-Standard Div. Crompton & Knowles Corp., Paweatuck, Conn. 06379. Kneaders are available from Buss America, Inc.: Bloomington, Ill.; and high shear mixers alternatively known as Gelimat™ available from Draiswerke G.m.b.H., Mamnheim-Waldhof, Germany; and Farrel Continuous Mixers, available from Farrel Corp., Ansonia, Conn. The screw components used for mixing, heating, compressing, and kneading operations are shown and described in Chapter 8 and pages 458-476 of Rauwendaal, Polymer Extrusion, Hanser Publishers, New York (1986): Meijer, et al., "The Modeling of Continuous Mixers. Part 1: The Corotating Twin-Screw Extruder". Polymer Engineering and Science, vol. 28, No. 5, pp. 282-284 (March 1988): and Gibbons et al., "Extrusion", Modem Plastics Encyclopedia (1986-1987). The knowledge necessary to select extruder barrel elements and assemble extruder screws is readily available from various extruder suppliers and is well known to those of ordinary skill in the art of fluxed polymer plastication.

The extruded polymer fiber structure may be formed from polyesters, polyethylene, polypropylene, nylon, elastomers, copolymers and its derivatives, including monofilament or bicomponent filaments having different melting points. In one example, the polymer fiber structure is an engineered polyester fiber material. An example polymer fiber structure according to this disclosure is wholly polyester structure, core polyester fibers that are sheathed in a polyester elastomer binder.

Engineered fibers can be solid or hollow and have cross-sections that are circular or triangular or other cross sectional geometries, e.g. tri-lobular, channeled, and the like. Another type of polyester fiber has a entangled, spring-like structure. During manufacturing the polymer fiber structure is heated by extrusion to interlink the fibers to one another to provide a more resilient structure. Fibers may be randomly oriented or directionally oriented, depending on desired characteristics. Such processes are discussed in U.S. Pat. No. 8,813,286, entitled Tunable Spring Mattress and Method for Making the Same, the entirety of which is herein incorporated by reference.

The fibers and their characteristics are selected to provide desired tuning characteristics. One measurement of "feel" for a cushion is the indentation-force-deflection, or IFD. Indentation force-deflection is a metric used in the flexible foam manufacturing industry to assess the "firmness" of a sample of foam such as memory foam. To conduct an IFD test, a circular flat indenter with a surface area of 323 square centimeters (50 sq. inches—8" in diameter) is pressed against a foam sample usually 100 mm thick and with an area of 500 mm by 500 mm (ASTM standard D3574). The foam sample is first placed on a flat table perforated with holes to allow the passage of air. It then has its cells opened by being compressed twice to 75% "strain", and then allowed to recover for six minutes. The force is measured 60 seconds after achieving 25% indentation with the indenter. Lower scores correspond with less firmness, higher scores with greater firmness. The IFD of the three dimensional polymer fiber layer tested in this manner and configured for use in a mattress has an IFD ranging from 5 to 25 pounds-force. The density of the three dimensional polymer fiber layer ranges from 1.5 to 6 lb/ft$^3$.

Once the desired three dimensional polymer layer is formed, liquid foam precursor materials for forming the foam are injected or poured over at least one surface of the extruded three dimensional polymer fiber structure to fill at least a portion of the voids, which is then placed in a mold or continuously processed and cured at an elevated temperature. The liquid foam precursor materials are selected such that the curing temperature is less than the softening and/or melting point of the polymer used to form the structure of the three dimensional polymer fiber layer. The surface or surfaces upon which the liquid foam precursor may be disposed is not intended to be limited and may include the top surface the bottom surface, one or more peripheral edges. In some embodiments, the three-dimensional polymer fiber may be completely encased. In other embodiments, the foam can be disposed on and in a portion of the bottom surface and the peripheral edges to form a pseudo-bucket like structure for the three dimensional polymer fiber layer. As such, the particular surface(s) upon which the foam is disposed and impregnated can vary from one or more of the above surfaces.

In one embodiment, the liquid foam precursor materials partially or completely fill the voids corresponding to a surface of the three dimensional fiber layer. In one embodiment, the surface is a top and/or bottom surface of the three dimensional fiber layer and the foam penetrate into at least 10 percent of the three dimensional fiber layer thickness, which serves to anchor the three dimensional polymer fiber layer to the foam, thereby overcoming the delamination issue. It should be apparent that the cured foam, in addition to the portion filling the voids of the three dimensional fiber layer for a fraction of the three-dimensional fiber layer thickness, may extend beyond the three-dimensional fiber layer. That is, a first portion of the foam thickness will consist of foam only; a second portion will be integrated with a fraction of the three-dimensional polymer fiber layer, e.g., greater than or equal to about 10% of the three-dimensional polymer fiber layer thickness; and a third portion will consist of the three-dimensional polymer fiber. Applicants have found that the addition of foam to at least a portion of the three dimensional polymer fiber layer will create a more differentiated product feel and a more durable structure when utilized in a mattress than either foam by itself or the extruded three dimensional polymer fiber layer as a stand-alone component. Moreover, the presence of the three dimensional polymer fiber layer will help increase airflow, dissipate heat, and enhance hygiene among other advantages.

The foam and three dimensional polymer fiber composite layer has a unique visual appearance in comparison to other materials currently used for comfort or support within a mattress. Incorporating foam within at least a portion of the three dimensional fibrous structure will create a dampening effect to change the feel and also improve the durability of the material. In addition to improving durability and resilience of the material, foam injected into the three dimensional polymeric fibrous structure will also reduce noise, reduce shear fatigue, overcome the problems associated with delamination, and also minimize "crunchiness" concerns previously noted by the three dimensional fiber layer when used by itself.

As noted above, the addition of foam into a least a portion of the three dimensional fibrous structure is a secondary process. The use of foam would be most effective (if the temperatures of foam processing do not exceed the melt point of the polymer temperature) in a "foam molding process". This would allow a "batch" style process and better control of the placement and areas where foam would be most effective in the three dimensional structure, rather than pouring through the entire material.

Suitable foams include, but are not limited to, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic foams. Some viscoelastic materials are also temperature sensitive, thereby also enabling the foam to change shape based in part upon the temperature of the supported part. Any of these foams may be open celled or closed cell or a hybrid structure of open cell and closed cell. Likewise, the foams can be reticulated or partially reticulated or non-reticulated. Still further, the foams may be gel infused in some embodiments.

The various foams suitable for use in the present disclosure may be produced according to methods known to persons ordinarily skilled in the art. For example, polyurethane foams are typically prepared by reacting a polyol with a polyisocyanate in the presence of a catalyst, a blowing agent, one or more foam stabilizers or surfactants and other foaming aids. The gas generated during polymerization causes foaming of the reaction mixture to form a cellular or foam structure. Latex foams are typically manufactured by the well-known Dunlap or Talalay processes. The only restriction with respect to these processes is that the curing temperatures and times for stabilizing and forming the foams are selected so as to not affect the desired properties of the three dimensional polymeric fiber. In one embodiment, the curing temperatures are selected to be below the melting and/or softening temperatures of the three dimensional polymeric fiber.

In one embodiment, the foam is a latex foam, which has relatively lower latex foam processing temperatures compared to other types of foams. The latex "continuous process" would allow a roll or topper of the three dimensional structure to be fed onto the oven belt and latex added onto the structure in areas where desired (to create a more robust product or to create zones in the material). The three dimensional polymer with foam or latex variants disclosed in this invention could then be used as either comfort layers or support layers within a mattress to replace foam, air bladders, or coils.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A single foam-fiber composite layer consisting of:
an extruded three dimensional polymer fiber portion having constant length, width and height dimensions, wherein the extruded three dimensional polymer fiber portion has a bottom surface, a top surface, and peripheral edges extending between the top and bottom surfaces, the extruded three dimensional polymer fiber portion consisting of randomly oriented polymer fibers bonded at coupling points between adjacent fibers and having a free volume per unit area of the layer; and
a foam portion disposed on and in a portion of the bottom surface and the peripheral edges of the extruded three dimensional polymer fiber portion, wherein the foam portion extends into at least 10 percent of the extruded three dimensional polymer fiber portion to provide the single roam-fiber composite layer with a foam-only portion, a roam and fiber portion, and a fiber-only portion, wherein a bottom surface and peripheral edges of the single foam-fiber composite layer consists of the foam-only portion.

2. The single foam-fiber composite layer of claim 1, wherein the extruded three dimensional polymer fiber portion is selected from the group consisting of polyesters, polyethylene, polypropylene, nylon, elastomers, copolymers and its derivatives, including monofilament or bicomponent filaments having different melting points.

3. The single foam-fiber composite layer of claim 1, wherein the foam portion comprises a polyurethane foam, a latex foam; a polystyrene foam, polyethylene foam, a polypropylene foam, a polyether-polyurethane foam.

4. The single foam-fiber composite layer of claim 1, wherein the foam portion is a viscoelastic foam.

5. The single foam-fiber composite layer of claim 1, wherein the foam portion has a lower curing temperature than a melting temperature and/or a softening temperature of the polymer fibers.

6. The single foam-fiber composite layer of claim 1, wherein the extruded three dimensional polymer fiber portion comprises multiple zones of the polymer fibers having different densities and/or indentation force deflection values.

7. The single foam-fiber composite layer of claim 1, wherein the height dimension of the three dimensional polymer fibers ranges from 1 to 6 inches.

8. The single foam-fiber composite layer of claim 1, wherein the extruded three dimensional polymer fiber portion has a density ranging from 1.5 to 6 pounds per cubic foot.

9. The single foam-fiber composite layer of claim 1, wherein the extruded three dimensional polymer fiber portion has an indentation force deflection ranging from 5 to 25 pounds-force.

10. The single foam-fiber composite layer of claim 1, wherein the extruded three dimensional polymer fiber portion is a polymer selected from the group consisting of polyester, polyethylene and polypropylene, and the foam is a latex foam.

11. A mattress comprising:
at least one single foam-fiber composite layer consisting of an extruded three dimensional polymer fiber portion having constant length, width and height dimensions, wherein the extruded three dimensional polymer fiber portion has a bottom surface, a top surface, and peripheral edges extending between the top and bottom surfaces, the extruded three dimensional polymer fiber portion consisting of randomly oriented polymer fibers bonded at coupling points between adjacent fibers and having a free volume per unit area of the layer; and
a foam portion disposed on and in a portion of the bottom surface and the peripheral edges of the extruded three dimensional polymer fiber portion, wherein the foam portion extends into at least 10 percent of the extruded three dimensional polymer fiber portion to provide the foam-fiber composite layer with a foam-only portion, a foam and fiber portion, and a fiber-only portion, wherein a bottom surface and peripheral edges of the at least one single foam-fiber composite layer consists of the foam-only portion.

12. The mattress of claim 11, wherein the extruded three dimensional polymer fiber portion is selected from the group consisting of polyesters, polyethylene, polypropylene, nylon, elastomers, copolymers and its derivatives, including monofilament or bicomponent filaments having different melting points.

13. The mattress of claim 11, wherein the foam portion comprises a polyurethane foam, a latex foam; a polystyrene foam, polyethylene foam, a polypropylene foam, a polyether-polyurethane foam.

14. The mattress of claim 11, wherein the foam portion is a viscoelastic foam.

15. The mattress of claim 11, wherein the foam portion has a lower curing temperature than a melting temperature and/or a softening temperature of the polymer fibers.

16. The mattress of claim 11, wherein the extruded three dimensional polymer fiber portion comprises multiple zones of the polymer fibers having different densities and/or indentation force deflection values.

17. The mattress of claim 11, wherein the height dimension of the three dimensional polymer fibers ranges from 1 to 6 inches.

18. The mattress of claim 11, wherein the extruded three dimensional polymer fiber portion has a density ranging from 1.5 to 6 pounds per cubic foot.

19. The mattress of claim 11, wherein the extruded three dimensional polymer fiber portion has an indentation force deflection ranging from 5 to 25 pounds-force.

20. The mattress of claim 11, wherein the extruded three dimensional polymer fiber portion is a polymer selected from the group consisting of polyester, polyethylene and polypropylene, and the foam is a latex foam.

* * * * *